US011045755B2

(12) United States Patent
Masten, Jr.

(10) Patent No.: US 11,045,755 B2
(45) Date of Patent: Jun. 29, 2021

(54) IN SITU REJUVENATION OF CONTAMINATED MECHANICAL FILTRATION MEDIUM

(71) Applicant: James W. Masten, Jr., Everett, WA (US)

(72) Inventor: James W. Masten, Jr., Everett, WA (US)

( * ) Notice: Subject to any disclaimer, the term of this patent is extended or adjusted under 35 U.S.C. 154(b) by 0 days.

(21) Appl. No.: 17/003,892

(22) Filed: Aug. 26, 2020

(65) Prior Publication Data

US 2021/0060463 A1 Mar. 4, 2021

Related U.S. Application Data

(60) Provisional application No. 62/891,528, filed on Aug. 26, 2019.

(51) Int. Cl.

| | |
|---|---|
| ***B01D 35/18*** | (2006.01) |
| ***C02F 1/00*** | (2006.01) |
| ***C02F 1/28*** | (2006.01) |
| ***B01J 20/34*** | (2006.01) |
| ***B01D 39/20*** | (2006.01) |
| ***B01D 36/00*** | (2006.01) |

(52) U.S. Cl.

CPC ......... *B01D 35/185* (2013.01); *B01D 36/001* (2013.01); *B01D 39/2055* (2013.01); *B01D 39/2068* (2013.01); *B01D 2201/08* (2013.01); *B01D 2201/309* (2013.01)

(58) Field of Classification Search

CPC .............. B01D 35/185; B01D 39/2055; B01D 39/2068; B01D 36/001; B01D 2201/08; B01D 2201/309; C02F 1/004; C02F 1/283; B01J 20/3441; B01J 20/3416

See application file for complete search history.

(56) References Cited

U.S. PATENT DOCUMENTS

| | | | | |
|---|---|---|---|---|
| 3,503,716 A * | 3/1970 | Heinz | F01N 3/38 | 422/170 |
| 3,533,753 A * | 10/1970 | Heinz | F01N 3/2803 | 502/324 |
| 4,025,426 A * | 5/1977 | Anderson | B01D 15/00 | 210/662 |
| 10,682,585 B2 | 6/2020 | Masten, Jr. | | |
| 10,717,933 B2 | 7/2020 | Masten, Jr. | | |
| 10,718,527 B2 | 7/2020 | Masten, Jr. | | |
| 10,738,368 B2 | 8/2020 | Masten, Jr. | | |
| 2008/0066621 A1* | 3/2008 | Naito | F01N 3/0226 | 96/55 |

* cited by examiner

*Primary Examiner* — Liam Royce

(57) ABSTRACT

An in situ system of filter rejuvenation can be applied to a mechanical filter passing fluid contaminated by chemical and particulate materials such that the filter removes the contaminants from the flow by trapping the contaminants in a filter medium. A non-combustive infrared heating system gasifies the trapped contaminants without combustion and without emissions to the atmosphere, restoring the efficacy of the filtration medium.

20 Claims, 8 Drawing Sheets

IN SITU REJUVENATION OF CONTAMINATED MECHANICAL FILTRATION MEDIUM

CROSS-REFERENCE TO RELATED APPLICATION

This application claims priority to and the benefit of Provisional Application No. 62/891,528, filed on Aug. 26, 2019, the disclosure of which is incorporated herein by reference.

BACKGROUND

Many examples of treatment of chemical- and particulate-contaminated flow are currently in use, including sewer flow treatment by mechanical filtration using activated charcoal as a filter medium. The advantages of such a system include the extraction of pharmaceuticals and chemicals from the flow in addition to suspended solids and particulates.

Some municipal water filtration systems use reverse osmosis filters incorporating ceramic plates with laser drilled holes that are micro-scale pores. It takes very powerful pumps to pump the dirty water through the pores to trap all the particulate. When the plates get clogged, typically after about 20 hours of use, a tank truck of hydrochloric acid comes to the sewer process facility and pumps acid backward through the filters to clean them. The back wash is then trucked to a land fill and dumped. The ceramic plates cost tens of thousands of dollars. Such systems are very expensive to operate and generate a large amount of toxic waste.

Other filtration systems use activated charcoal as a filter medium. Activated charcoal is a type of carbon that is heat treated in an oxygen-free environment. This treatment creates many microscopic holes in the carbon that increase the surface area of the carbon by several orders of magnitude. The surface of the carbon has an affinity for hydrocarbon materials. The carbon can attract and hold hydrocarbon chemical compounds up to approximately 1/10 the weight of the carbon.

Most sewer system carbon filters are used to accommodate overflow or surge flow that exceeds the treatment capacity of a principal processing system. Carbon filters are typically sized to accommodate overflow or flood conditions that are anticipated to occur once or twice a year, especially when storm sewers are plumbed into sanitary sewers. After the carbon filters are used, most conventional system operators ship the used carbon to a landfill and install new carbon.

Several currently operating plants in California and many more in Europe use carbon filtering as the principal wastewater treatment process in a single step solution where only a nominal expectation of a large storm flow is present; therefore, the carbon filter components of those systems are sized to handle all of the expected daily flow. This would be a large continuing expense except that there has been an effort to develop a method to “rejuvenate” their activated carbon and reuse the carbon many times over.

Most sewer treatment plants using carbon block filters as a single-step process operate on an exchange basis with the carbon vendors who remove and replace the carbon on a regular and scheduled basis; but some plants have now installed rejuvenation capabilities at the sewer processing facility. This significantly reduces the transportation costs, which can be significant when 300,000 to 500,000 pounds of carbon are replaced every 30 to 50 days or so.

Common to all of the existing rejuvenation technologies in operation today is the use of combustion fuels to heat the charcoal and gasify the collected hydrocarbons and release them from the surface of the charcoal. Combustive processes have a limited thermal range, which can result in incomplete combustion of certain waste materials, and require mechanical elements to handle the combusted strata as well as the gasses output from the combustion. Accordingly, conventional processes are relatively inefficient and expensive, and produce a large amount of carbon dioxide gas relative to their thermal output.

BRIEF SUMMARY

Embodiments of the current disclosure are directed toward a method and apparatus for a non-combustive gasification of waste and in situ filter media rejuvenation system which comprises a containment vessel whose walls are constructed of a material with infrared transmissivity and which is filled with a temperature-tolerant filter media (e.g., mineral fibers, porous ceramic, charcoal). In operation, a full flow of a liquid solvent carrier (e.g., water, alcohol) with an included contaminant is pushed through the filter, allowing the contaminant to be collected by the filter media. When the surface of the loaded media creates a sufficient back pressure or the mass of the filter media increases to a predetermined level, the filter media is exchanged, cleaned or rejuvenated.

In an embodiment, a process of rejuvenating a charcoal media filter in situ includes stopping the flow, removing the excess liquid solvent carrier by vacuum extraction and heating the charcoal in a vacuum using infrared energy transmitted through the containment walls of the filter vessel. As the materials collected by the charcoal are heated to the vapor point (gasified) without combustion, they are converted to a SynGas collected as a product material. After the collected materials are removed, the process returns the flow to the filter and begins the filtering process again.

In an embodiment, a process for filtering a contaminated fluid and in situ rejuvenation of a filter medium may include introducing a flow of the contaminated fluid into a reaction chamber comprising a filter medium and a first array of infrared heating elements separated from the filter medium by a first ceramic glass wall having a pass-band in the infrared spectrum, passing the contaminated fluid across the filter medium to remove contaminants from the contaminated fluid until the filter medium is loaded, stopping the flow of the contaminated fluid across the filter medium, heating the loaded filter medium by transmitting infrared energy from the first array of infrared heating elements through the first ceramic glass wall at a frequency within the pass-band of the infrared spectrum to volatilize the contaminants trapped in the loaded filter medium, collecting the volatilized contaminants, and re-introducing the contaminated fluid flow into the reaction chamber.

In an embodiment, a process for in situ rejuvenation of a filter medium includes introducing a flow of contaminated fluid into a reaction chamber comprising the filter medium, a first array of infrared heating elements separated from the filter medium by a first ceramic glass wall having a pass-band in the infrared spectrum, and a second array of infrared heating elements separated from the filter medium by a second ceramic glass wall having the pass-band in the infrared spectrum, passing the contaminated fluid across the filter medium to remove contaminants from the contaminated fluid until the filter medium is loaded, stopping the flow of the contaminated fluid across the filter medium, heating the loaded filter medium by transmitting infrared energy from the first and second arrays of infrared heating elements through the first and second wall of the ceramic glass material at a frequency within the pass-band of the infrared spectrum to volatilize the contaminants trapped in the loaded filter medium, collecting the volatilized contaminants, and re-introducing the contaminated fluid flow into the reaction chamber.

DESCRIPTION OF DRAWINGS

The foregoing aspects and many of the attendant advantages of embodiments of this disclosure will become more readily appreciated by reference to the following detailed descriptions, when taken in conjunction with the accompanying drawings, wherein.

DETAILED DESCRIPTION

Figure 1:
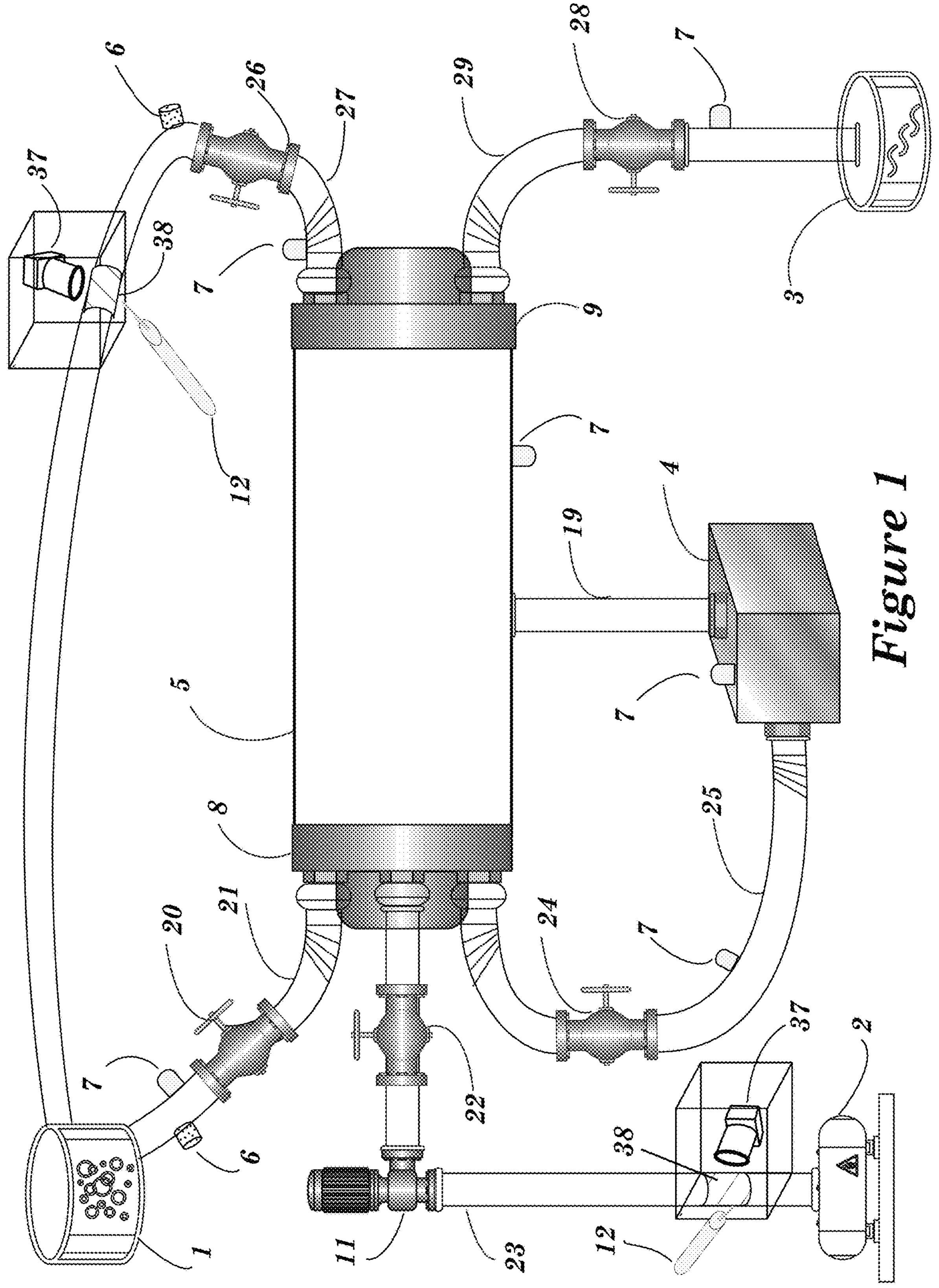
FIG. 1 illustrates an embodiment of an in situ filter rejuvenation system.
Figure 2:
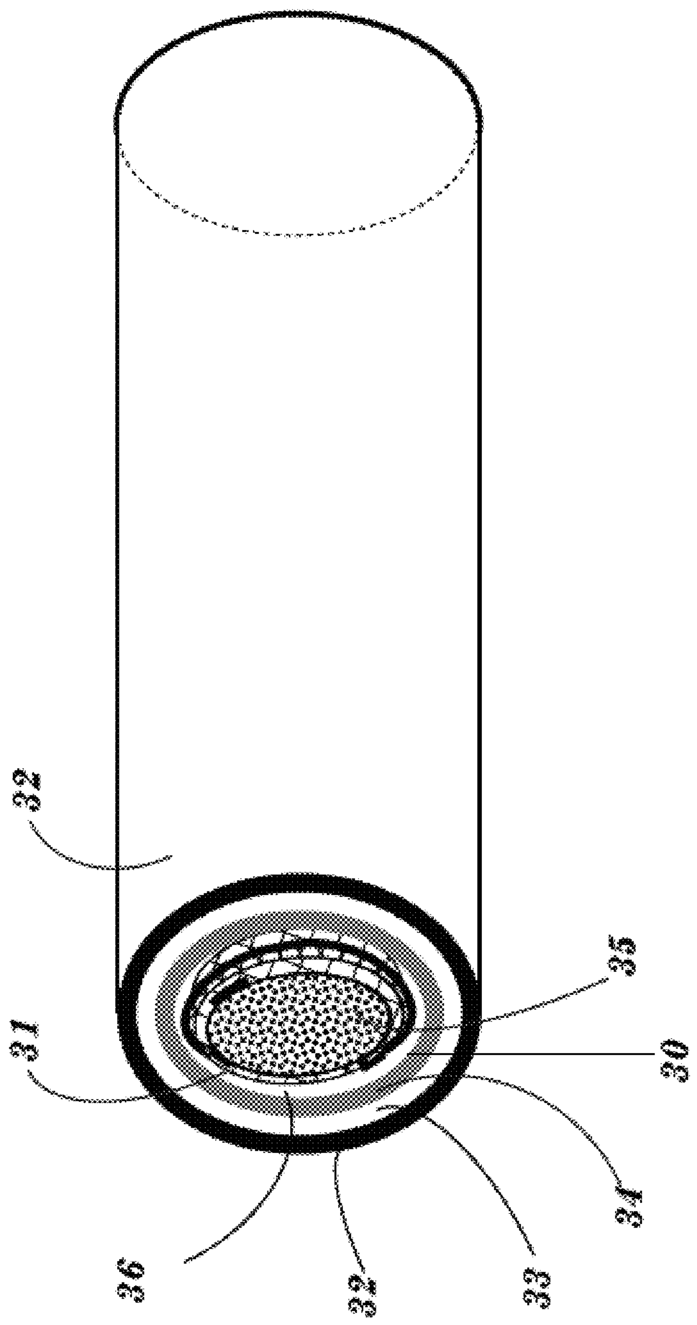
FIG. 2 illustrates an outer water-cooled pressure bulkhead of the embodiment of the filter rejuvenation system of FIG. 1 with input vacuum rotary valve removed to reveal the input end of the infrared transmissive chamber.

The following list provides a number of specific descriptions and examples of components present in the figures. The descriptions in the list are illustrative of specific embodiments, and should not be construed as limiting the scope of this disclosure.

REFERENCE

Markings Description

1 Source of contaminated input material
2 SynGas storage tank
3 Output fluid storage tank
4 Pressure compensation system
5 Reaction chamber
6 Flow sensor
7 Pressure sensor
8 Machined Refractory Input Manifold/Retainer
9 Machined Refractory Exit Manifold/Retainer
11 Vacuum extraction pump
12 Illuminating laser, enabling species identification by spectroscopy
19 Pressure compensatory gas conduit
20 Input flow valve
21 Input flow conduit
22 Vacuum extraction valve
23 Vacuum conduit
24 Pressure compensation valve
25 Pressure compensation conduit return
26 Sampling port valve
27 Sampling port conduit
28 Output filtered water valve
29 Output filtered water conduit
30 Refractory lining
31 Highly infrared-transmissive interior chamber wall
32 Pressure bulkhead
33 Cast water-cooled inner chamber
34 Water-cooled inner wall into which emitters are embedded (which may be coated with refractory lining 30 on a side exposed to heat reflected from transmissive walls 31)
35 Filter medium
36 Gas collection chamber
37 Sensor
38 Transmissive window to the filtered flow
39 First infrared radiators
40 Inner Refractory lining
41 Highly infrared-transmissive interior chamber wall
42 Inner Pressure bulkhead
43 Inner cast water-cooled inner chamber
44 Water-cooled inner wall into which emitters are embedded (coated with refractory lining 40 on side exposed to heat reflected from transmissive walls 41)
46 Inner Gas collection chamber
47 Inner void
49 Second infrared radiators
50 Infrared radiator element
52 Coiled wire
54 Retainer
56 Backing
58 Temperature sensor
60 Center coil of the coiled wire
62 Temperature sensor leads
64 Ceramic refractory material
66 Ceramic insulator material A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Embodiments of the present disclosure are directed to an in situ system of carbon filter rejuvenation, and a system for in situ carbon filter rejuvenation within a water-filtration or other filtration or solvent fluid contaminant-removal system. This system makes use of at least one cylinder of ceramic glass or two or more concentric cylinders of ceramic glass, wherein the glass is formulated to have a highly efficient passband in the infrared region of electromagnetic emission. The infrared transmissive reaction chamber 5 is a tubular construction that accepts a passband of transmitted infrared energy of selected wavelengths through 90% or more of its circumference and 90% or more of its longitudinal axis.

Figure 6A:
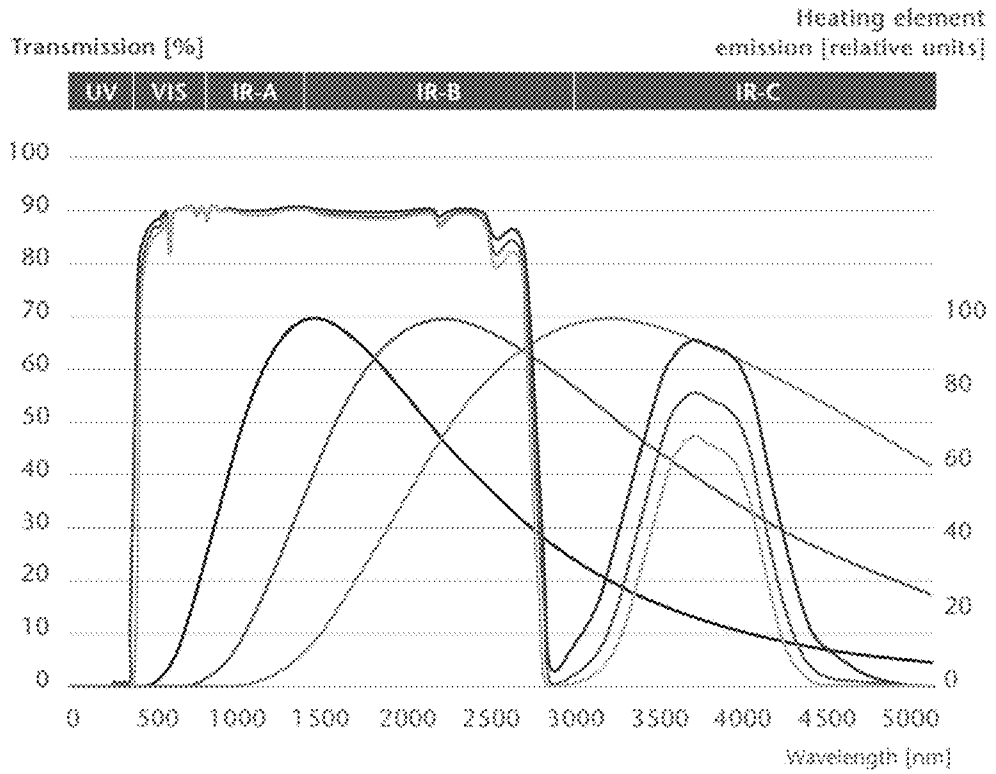
FIG. 6A illustrates infrared transmissivity of a transparent ceramic glass.
Figure 6B:
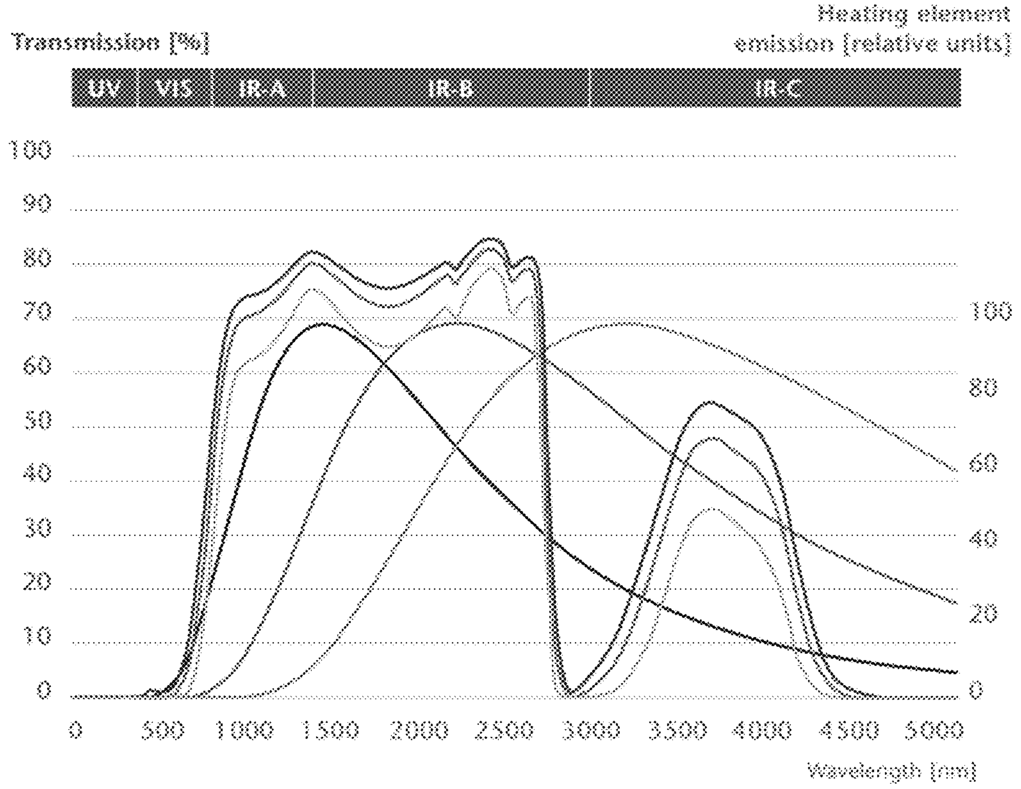
FIG. 6B illustrates infrared transmissivity of a tinted ceramic glass.

FIGS. 6A and 6B illustrate examples of two passbands of ceramic glass for infrared energy. FIG. 6A shows transmission characteristics for non-tinted translucent ceramic glass, and FIG. 6B shows transmission characteristics for tinted or opaque ceramic glass.

The figures show that the lower passband (low frequency, long wavelength) nominally covers wavelengths from about 3,500 nm to about 4,250 nm. The relationship of wavelength to temperature is given by Wien's Displacement Law:

$$T = \frac{2.898\times 10^{-3}\ \text{m}\cdot\text{K}}{\lambda_{peak}}$$

These lower passband wavelengths correspond to temperatures of approximately 410° C. to 550° C. (about 770° F. to about 1022° F.).

However, as presented in the transmissivity charts, the peak transmissivity for the lower passband is at best 60%, and that is over a narrow portion of the band. Accordingly, radiant elements that operate in this lower passband are wasting at least 40% of their energy output as ineffective localized heating.

The upper passband (higher frequency, shorter wavelength) is characterized by wavelengths shorter than 2,700 nm and longer than 500 nm for clear ceramic glasses and for the heavily opaque ceramic glasses from 2,700 nm down to at least 1,900 nm. These passbands, at wavelengths corresponding to temperatures between 800° C. and 1,250° C., are where the transmission of infrared radiant energy is nominally 70% to 90% efficient. Embodiments of the present disclosure may emit infrared energy in the upper passbands of the ceramic glass materials. However, embodiments are not limited to these specific materials or passbands.

In an embodiment, the reaction chamber 5 is a component of the system in which filter medium 35 is stored. The mounting and support structure for the infrared transmissive tubular construction includes components 19, 21, 23, 25, 27, and 29, which are components of a fluid conveying assembly by which the feedstream-carrying fluid moves through the system and chemical contaminants, minerals and suspended solids are collected by the filter medium 35. The filter medium 35 may be, for example, activated charcoal, a porous or fibrous mineral or ceramic strata, etc. Typically, a porous or fibrous mineral or ceramic strata is employed as a flat-plate filter.

In one embodiment, a cylindrical reaction chamber 5 may be filled with granular activated carbon as a filter medium 35. Contaminated fluid (e.g., sewer flow) from source 1 passes through the ends of the filter medium in the chamber such that the filter medium 35 removes chemicals including pharmaceuticals, particulate matter, and other contaminants from the output flow of filtered water to distribution center 3. In some embodiments, the contaminated fluid may be wastewater from an industrial process such as a mining process, a chemical manufacturing process, a pharmaceutical manufacturing process, a food or produce preparation process, an agricultural process, etc.

The reaction chamber apparatus 5 may be constructed using machined refractory material as retainers for the input end 8 of the chamber's transmissive walls. The transmissive walls may be fitted together using machined refractory components, while output end retainer 9 is disposed on an opposite side of chamber 5 from the input end retainer 8. In combination, the input and output end retainers, chamber and conduits provide a sealed, closed-loop system.

The first infrared radiators 39 of the system supply high-temperature radiant energy transmitted through the transmissive walls 31 to the filter medium 35 and the collected contaminants.

Figure 7:
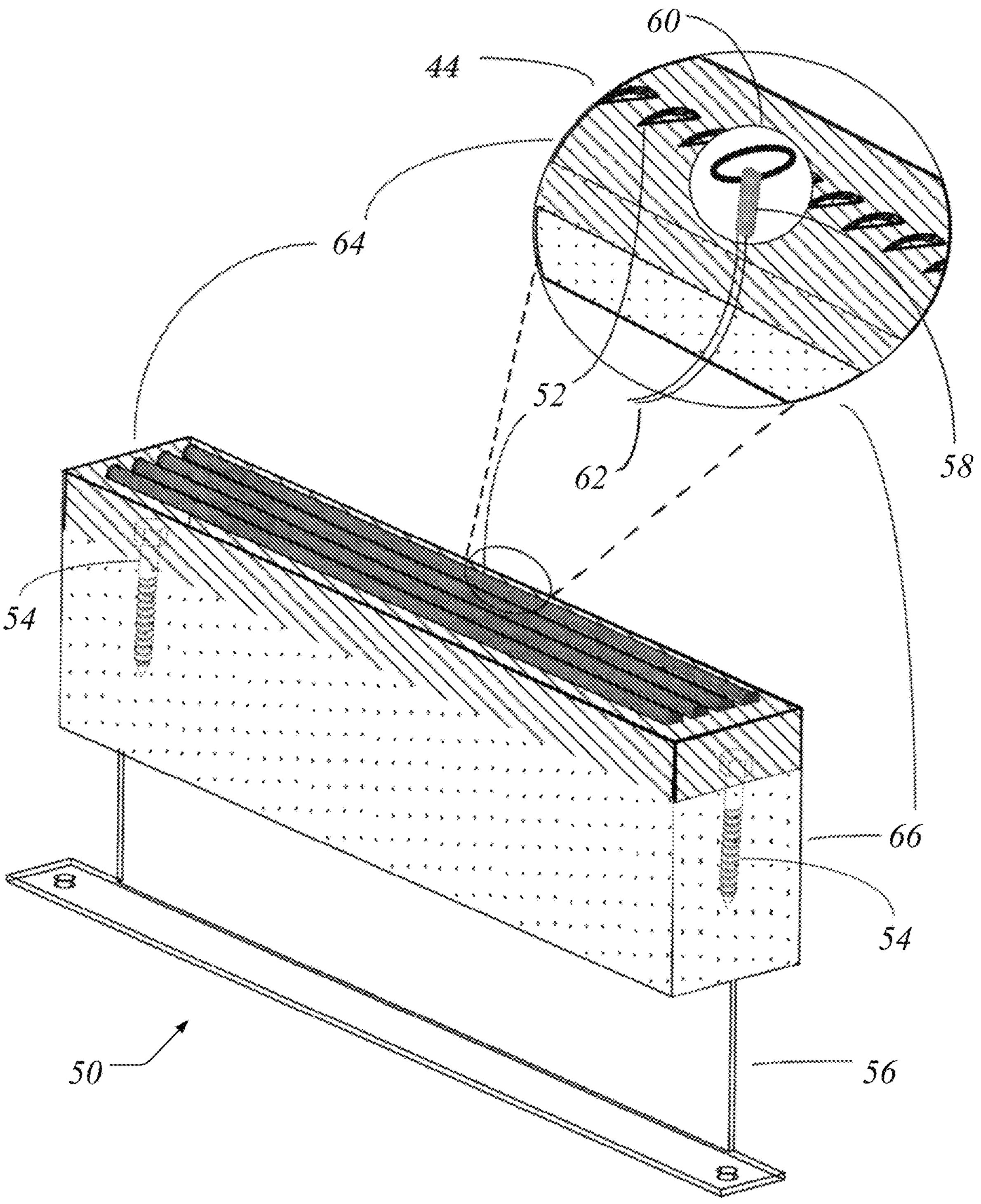
FIG. 7 illustrates an embodiment of an infrared heating element.

FIG. 7 illustrates an embodiment of an infrared radiator element 50 that may be one of the first infrared radiators 39. The infrared radiator element 50 may be constructed of coiled wire 52 that has been set in a ceramic matrix or putty 54 along with an in situ temperature measurement sensor 56. The wire may be Nickel-Chrome, or an equivalent stable resistance vs. temperature material. In an embodiment, only 30 to 40% of each coil sits outside of the ceramic. The configuration shown in FIG. 7 allows the coiled wire 52 to be heated above its plastic deformation temperature.

The infrared radiator element 50 may be formed by pouring ceramic into a mold that sits on top of a low-density fibrous ceramic refractory thermal insulator 66. Unlike conventional emitters that use metal retention devices to secure the castable ceramic to low-density ceramic insulation, which have a propensity for delamination because of the incompatibility of the coefficients of expansion, an embodiment of the present disclosure may use one or more pin or screw type retainer 54 constructed from a machinable refractory with a coefficient of expansion which is compatible with the castable ceramic. A metal, e.g. aluminum, backing 56 may be present, but in such an embodiment the edges near the radiant energy face of the emitter may be refractory coated to form a significant thermal barrier.

Additionally, a temperature sensor 58 in a protective sheath of a material such as Inconel or Stainless Steel may be embedded in the castable ceramic such that it is embedded near center coil 60. Temperature sensor leads 62 are brought out the back of the emitter 50 and routed to a controller which may monitor and control output to the coils. In an embodiment, the protective sheath is in direct contact with a coil.

This construction restricts the emission of the radiant energy to a half cylinder near-Lambertian surface which concentrates the power of the emissions within 45° of normal to the long axis of the emitter for most of the emitter length.

The physical implementation of the coil embedment significantly extends the temperature range or wavelength of the emitter, and the embedded temperature sensor enables a capability for variable but precisely controlled radiant energy output. This capability contributes to the optimum tunability of the infrared radiators 50 and enables the reliable projection of infrared radiant energy through the pass band of the ceramic glass material. The effective tunability of the radiant emitters spans a temperature range from less than 500° F. (260° C.) to more than 2,200° F. (1,200° C.), and can be controlled to an accuracy of less than 2° C.

In an embodiment, the coils 52 have a coil diameter of 12 to 17 wire diameters. The coils 52 are set inside a ceramic refractory 64 that is "cast" with the coils partially submerged into the ceramic refractory, such that only a length of wire equal to about 12 to 17 diameters of the wire is exposed to radiate above the common surface of the castable ceramic refractory 64 in an array of evenly spaced and co-aligned arcs. The wire coils may be positioned in, and supported by, the ceramic such that the surface tension of the coils overcomes plastic deformation for the selected range of heating.

The ceramic may be poured into a molded or machined ceramic insulator 66 that is from about 18 mm to 25 mm or thick. This shell serves to provide a structure that can accept the over-mold of the castable ceramic that is used to cover the radiant element. Machined grooves may be cut into the machinable refractory thermal insulator to assist manufacturing and the ceramic insulator 66 effectively minimizes the transmission of thermal energy from the embedded element to the space behind the radiant element.

The performance of the infrared radiator element 50 shown in FIG. 7 is significant. The limited exposure (approximately 30% of each coil is exposed outside of the ceramic) of the resistive wire coil segments provides a restricted surface area from which the radiant energy created by the current flow through the (resistive) element can escape.

In this implementation, the ceramic matrix additionally provides physical support to most of each coil's radiant surface. This feature allows reliable operation above the plastic deformation temperature of the resistive element, such as nickel chromium alloy or some resistive conductor chosen for its robust thermal performance. These super-heated coil segments are light enough that surface tension becomes a factor enabling the coils to maintain their shape against gravity and thus overcome plastic deformation and nearly doubling the useful temperature range of the emitter.

This construction restricts the emission of the radiant energy to around one third of the radiant element's surface area. The high performance castable ceramic refractory 64 quickly heats up to nearly the temperature of the radiant wire, minimizing the radiant transfer of energy to the ceramic, because only a portion of the radiant element is exposed to a lower temperature heat sink opportunity. By the Stefan-Boltzmann Law, the effectiveness of radiant energy transfer is proportional to the fourth power of the difference in temperature between the emitter and the receiver. This physical construction restricts the exposed portions of the radiant element to be the only path for the thermal energy to exit the radiant element 50.

Since less than half of the radiant surface of the conductor through which the electrical current is flowing is available as a pathway for radiant energy release, the intensity or power per unit area is driven up to approximately double the typical operating temperature for a given element and a stated current flow. A Lambertian surface emits radiant energy as a cosine function of the viewing angle normal to the surface—as such, more than 70% of the radiant energy released by the radiant element 50 is projected within 45 degrees of normal to the element surface.

The radiant energy from the inner side of each coil 52 is exposed directly to the surface of the high thermal-capacity, low thermal-conductivity refractory material 64. The refractory 64 quickly heats up and becomes a thermal energy radiator at nearly the same temperature as the radiant element. Although the refractory material 64 is a significant insulator and conducts very little heat away from the element, by the Stephen-Boltzmann law it also couples very little heat into the material from the radiant element.

When the efficiency of filter medium 35 begins to decline, as measured by a pressure gradient between pressure sensors 7 and flow sensors 6 across the flow from input to output and/or an increase in the flow of micro particulate at the output, as measured by illuminating laser 12 and sensor 37 through transmissive window 38, or the mass of the activated charcoal filter has significantly increased, the contaminated flow is terminated. In an embodiment, sensor 37 is a broadband spectroscopy camera which analyzes samples to determine contaminant levels in filtered flow. FIG. 1 shows an embodiment in which sampling port 27 returns fluid to the source 1—however, in other embodiments, the sampled fluid may be conveyed to output storage tank 3 or some other location.

The remaining water is removed by vacuum distillation and a ring of frequency-tunable infrared emitters 39 is used to heat the highly infrared-transmissive interior chamber wall 31 and the filter medium 35 to temperatures in excess of 390° C. At these temperatures, chemicals and trapped hydrocarbons from the contaminated flow are gasified or converted to a gaseous state. The hydrocarbon gas emitted from the volatilized hydrocarbon contaminants into gas collection chamber 36 is collected in storage tank 2 via a vacuum extraction system 11, and may be used as a fuel gas or as a feed material to other transformational processes.

A system according to the present disclosure may be engineered to isolate the areas 33 and 36 and 47 from the emitters 39 and outer pressure bulkhead 32. All internal chambers isolate their various contained constituents and may use pressure sensors 7 and one or more pump in a pressure compensation system 4 to maintain pressures in these spaces to be within a predetermined range of one another and minimize the pressure loads across the inner chamber walls. For example, the pressure differential may be maintained to be within +/−1 psi over an operating range of 90 psi. In some embodiments, the range may be +/−0.5 psi, +/−2 psi or +/−3 psi. The precise pressure differential between the isolated areas may depend on the materials and construction techniques used for a particular embodiment. The pressure compensation system 4 may interface with the internal chambers, or open spaces, through one or both of the input and output manifolds 8 and 9.

After the collected contaminants are processed, the cylinder and the filter medium 35 are returned to the filtering flow process activity. Material selection and design considerations are used to minimize the expansion of materials and the resulting sealing challenges as some components are heated and some are cooled. Design considerations include dimensional tolerances which are based on the coefficient of thermal expansion (CTE) of the selected material and the range of controlled temperatures for the system.

The ceramic glass and the insulating material used to support the glass may have low CTE. For example, CTE values of the ceramic glass and insulating materials may be on the order of $5\text{-}7\times10^{-7}$ or less. As such, even if the ceramic glass and insulating materials are exposed to cold water while in a very hot state they will not suffer failure due to thermal shock.

Figure 3:
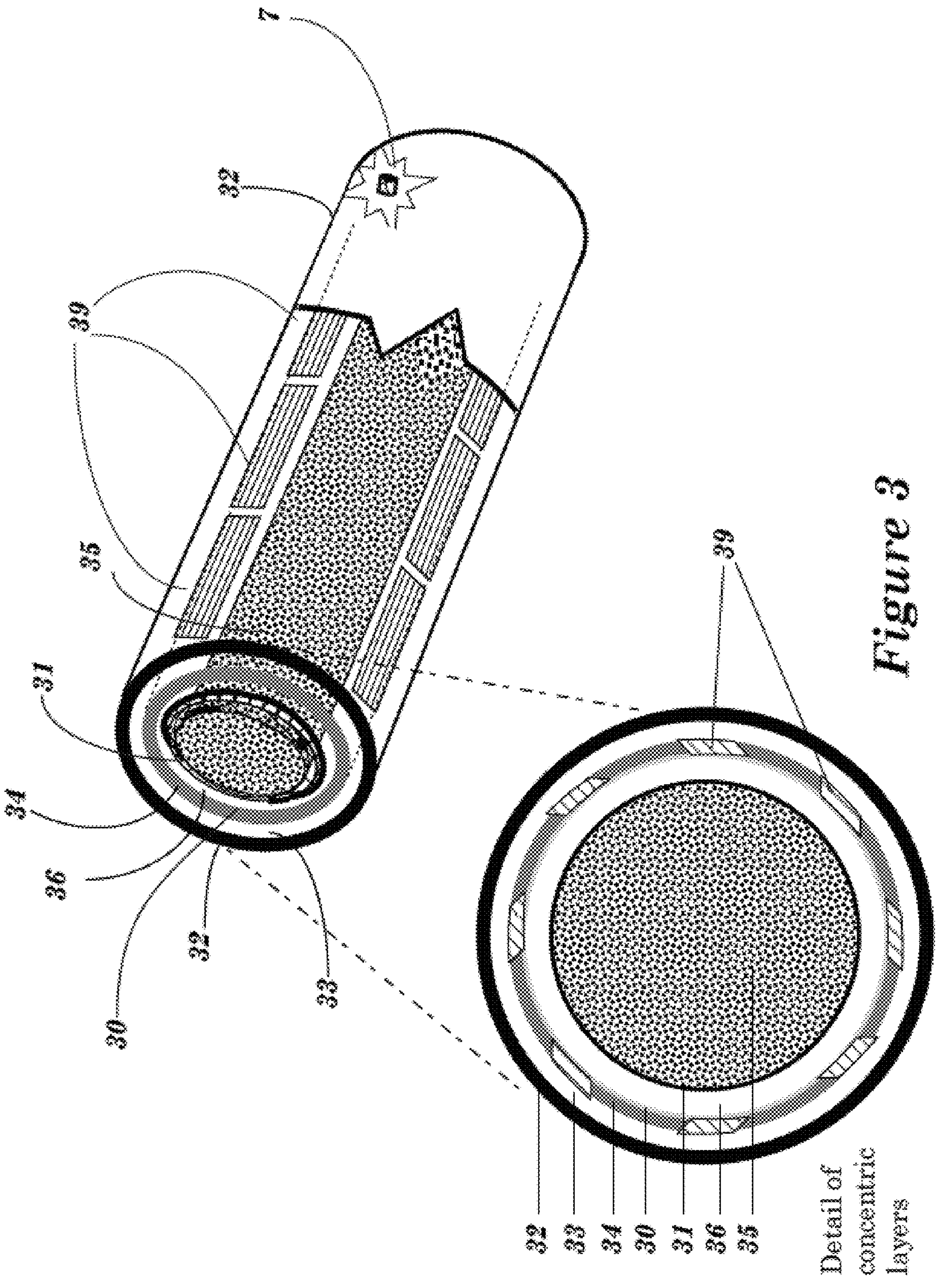
FIG. 3 is a cross-sectional view that reveals infrared radiant sources through the outer water-cooled pressure bulkhead of the carbon rejuvenation system.
Figure 4:
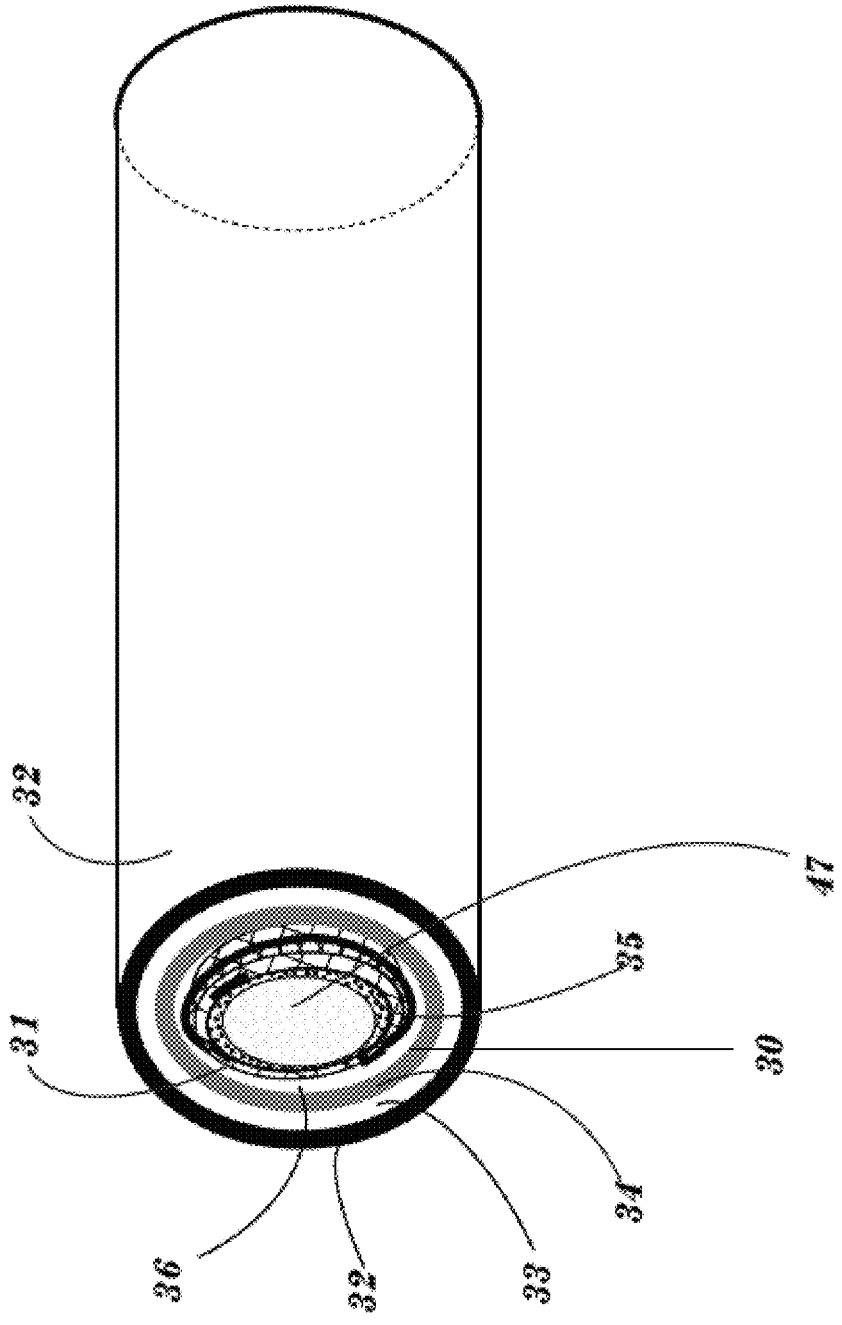
FIG. 4 illustrates an embodiment of a filter rejuvenation system with concentric cylindrical transmissive walls.

FIGS. 3 and 4 illustrate an embodiment in which a core of filter medium 35 is disposed in the center of a reaction chamber 5, and an array of first infrared radiators 39 is disposed around the filter medium. In such an embodiment, radiant emitters 39 are mounted inside the pressure vessel 32 and protrude through the inner refractory-lined walls 34. The water-cooled chamber 33 circulates water to remove heat from the refractory lining 30 of the interior walls of the chamber housing. The cooling provided to the pressure bulkhead 32 enables the efficient and inexpensive sealing of the infrared transmissive chamber 5 from the atmosphere. The inner walls 34 are protected from the radiant energy by the extensive use of a machinable refractory 30 to provide a thermal barrier and limit the penetration of infrared energy.

Figure 5:
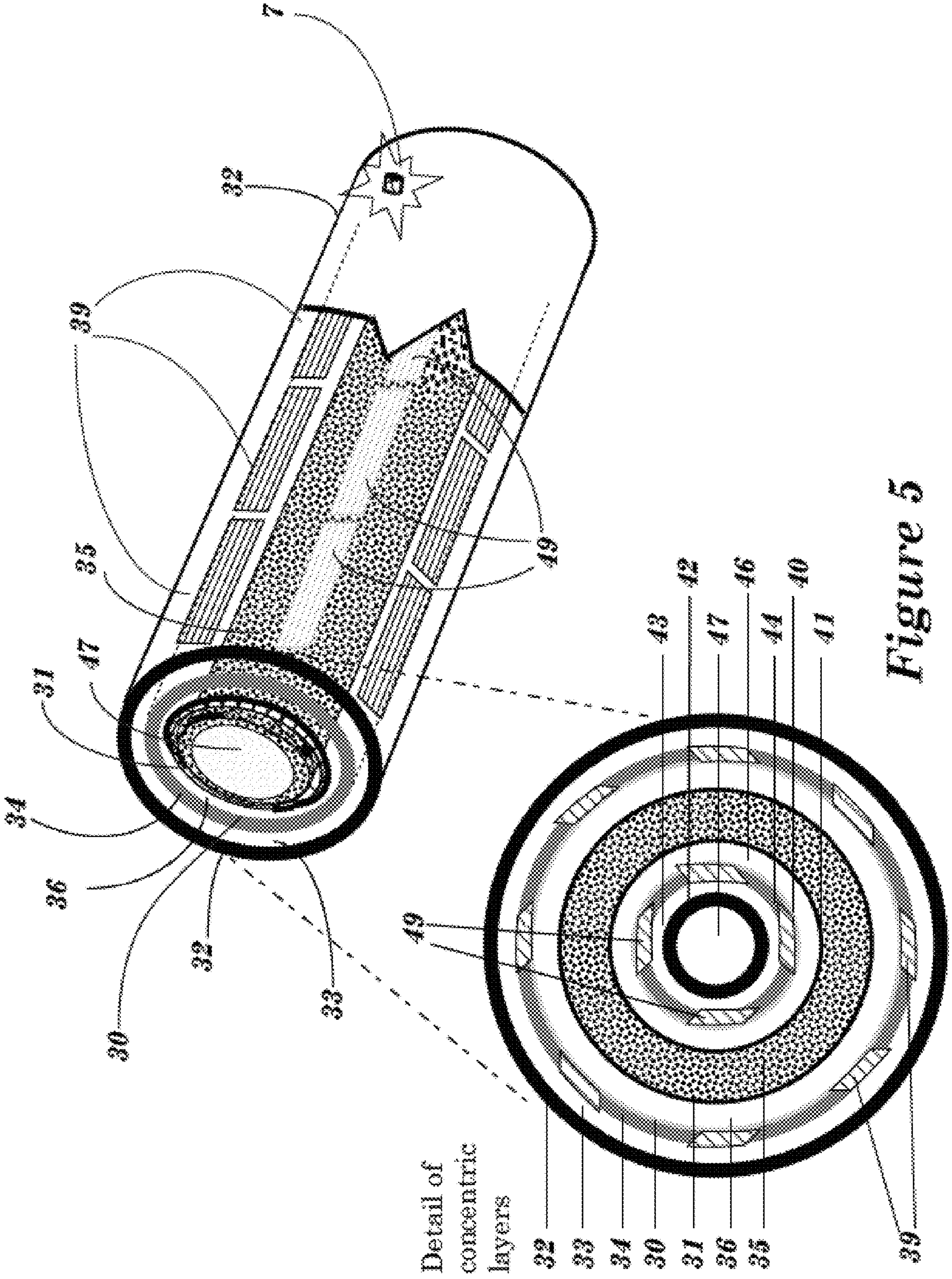
FIG. 5 illustrates an embodiment of infrared emitters down the infrared-transmissive central core of the embodiment of FIG. 4.

FIGS. 4 and 5 illustrate an embodiment in which a void 47 is present in the center of the chamber. In the embodiment of FIGS. 4 and 5, a first array of infrared radiators 39 is disposed outside of an outer transmissive wall 31 and directed inward towards the filter medium 35, and a second array of infrared radiators 49 is disposed inside of a second cylindrical transmissive wall 41 and directed outwards toward the filter medium 35. Accordingly, the filter medium 35 is disposed within a space between first 31 and second transmissive walls 41, and receives infrared energy from both arrays, significantly shortening the thermal energy path length and increasing the exposed surface area relative to an embodiment in which void 47 is not present.

Figure 8:
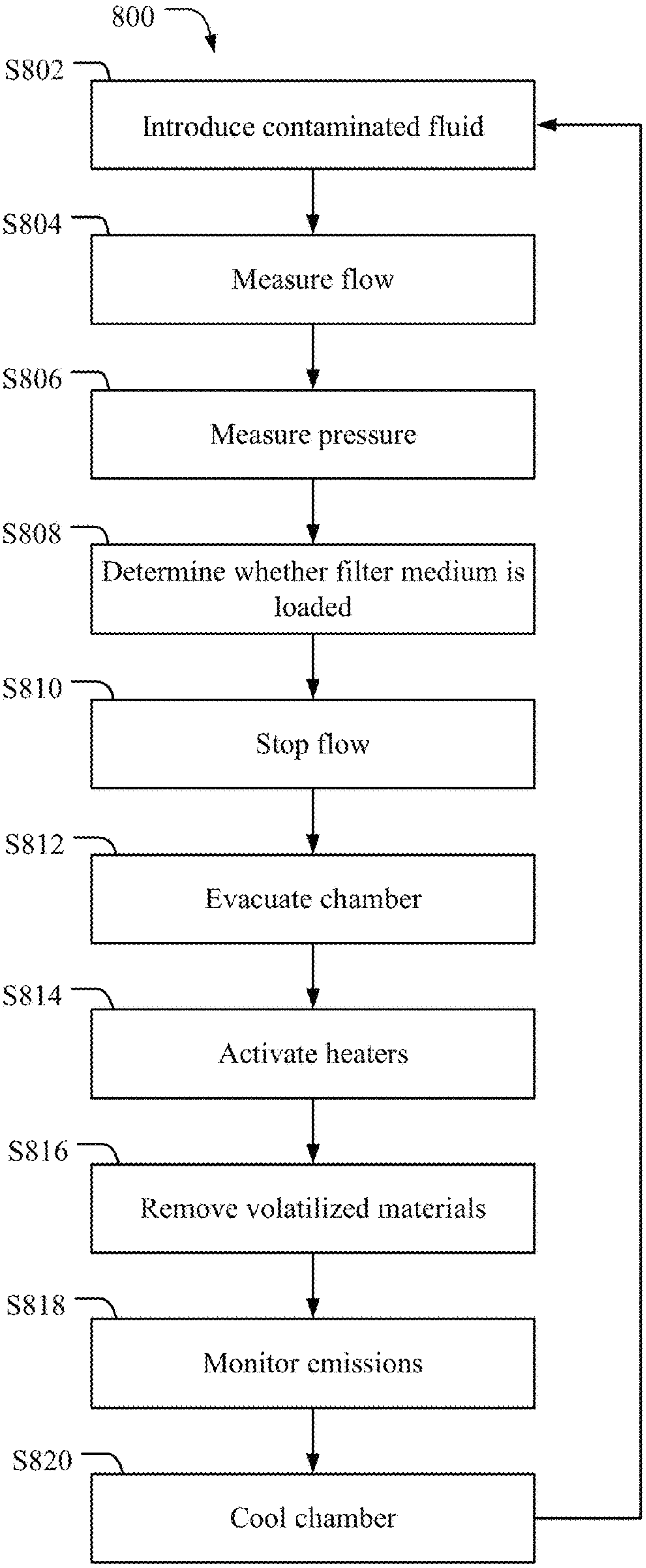
FIG. 8 illustrates an embodiment of a process for in situ rejuvenation of a filter medium.

An embodiment of a process 800 for filtration of contaminated fluid and in situ rejuvenation of a filter medium 35 will now be explained with reference to FIG. 8. Elements of process 800 may be practiced in addition to or instead of process steps described above. Accordingly, the following description is supplementary to the above disclosures, and should not be construed as limiting.

A contaminated fluid from a source 1 is introduced into a reaction chamber 5 through input flow conduit 21 at S802. In an embodiment, the source 1 may be a pipe or tank of municipal wastewater, agricultural waste, industrial waste, etc. Although only one reaction chamber 5 is shown in FIG. 1, some embodiments may comprise a plurality of reaction chambers coupled in parallel to a single source 1. In such an embodiment, one or more reaction chamber can continue to filter contaminated fluid while one or more reaction chamber is engaged in in situ rejuvenation.

When contaminated fluid is introduced into the reaction chamber 5, the system may monitor flow rate through the reaction chamber at S804 to determine the loading state of the filter medium 35 by one or more flow sensor 6 disposed in input and output flow paths. When a measured flow is below a threshold value at a predetermined pressure, the system may determine that the filter medium 35 is loaded.

Typically, the filter is loaded after removing contaminants from fluid over time. In some cases, the filter medium 35 may be excessively loaded due to an inadequate rejuvenation cycle from a previous rejuvenation, in which case flow is stopped and filter rejuvenation may be performed a second time. In addition, the filter medium 35 may become saturated with minerals or other materials that are resistant to volatilization after undergoing a plurality of rejuvenation processes, in which case the filter medium 35 may be replaced. In some embodiments, the filter medium 35 is replaced after a predetermined number of rejuvenation cycles.

Pressure may be monitored at S806 to determine a state of the filter medium 35, which may be performed in conjunction with or separate from monitoring flow rate at S804. Pressure may be monitored by passing a fluid through the filter medium 35 at a predetermined pressure and measuring pressure drop across the filter medium based on a difference in pressure values from pressure sensors 7 disposed at an inlet and outlet of the reaction chamber 5. If the pressure drop is within a predetermined range, then the filter medium 35 may be determined to be in acceptable condition, and contaminated fluid may be introduced into the reaction chamber 5 so that the reaction chamber 5 is in a normal operational state.

The system may determine that the filter medium 35 is loaded at S808 by monitoring one or both of pressure and flow described above with respect to S804 and S806. For example, the system may determine that the filter medium 35 is loaded when a pressure differential between inlet and outlet pressures exceeds a predetermined value, when the outlet pressure exceeds a predetermined value, when a flow rate at a predetermined pressure is lower than a predetermined value, etc. In another embodiment, the system may determine that the filter medium 35 is loaded by monitoring the mass of the filter medium, for example by weighing the chamber 5 at various time points.

When the system determines that the filter medium 35 is loaded, flow of the contaminated fluid may be stopped at S810 by closing input flow valve 20 disposed in the input flow conduit 21. After stopping the flow, the chamber 5 is evacuated at S812. The chamber 5 may be evacuated, for example, by simply closing input flow valve 20 and allowing the chamber to drain, by activating a pump coupled to the outlet flow path from the reaction chamber 5, or injecting pressurized gas into the inlet flow path.

The filter medium 35 is heated by activating an array of infrared radiators at S814. The infrared radiators may be activated by applying continuous or pulsed energy to resistive coils of the radiators so that they emit infrared radiation in a frequency corresponding to the passband of the ceramic glass material. In the embodiment of FIGS. 3 and 4, first infrared radiators 39 are activated at S814, and in the embodiment of FIGS. 5 and 6, first infrared radiators 39 and second infrared radiators 49 are both activated.

The infrared radiation emitted from the radiators passes through the ceramic glass material and heats the contaminated filter medium 35. The filter medium 35 may be heated to a temperature sufficient to volatilize contaminants trapped within the filter. Persons of skill in the art will recognize that the volatilization temperature may vary depending on the type of contaminant. In embodiments, the filter medium may be heated to a temperature of from about 340 degrees Centigrade where most organics will volatilize to about 700 degrees Centigrade, which is above the activation energy where many volatilized organic molecular structures will break down to simpler structures, and even to about 800 degrees where many organic simple structures will cross-link forming more complex structures. In some embodiments, the filter medium may be heated to a temperature from 300 degrees Centigrade to 850 degrees Centigrade.

As the contaminants and remaining water are volatilized by the infrared radiant energy, the volatilized gasses may be removed from the reaction chamber 5 at S816 by activating a vacuum pump 11 coupled to the reaction chamber through manifold 8 and in fluid communication with the space occupied by the filter medium 35 and opening vacuum extraction valve 22. In an embodiment, moisture may be removed from the emitted gasses by a water filter coupled to the vacuum conduit 23. Volatilized gasses from the contaminants may be syngas, which is a useful component to various industrial processes. The syngas or other gas emissions may be collected in storage tank 2, after which it can be used, sold, combusted, or sequestered.

Volatilized emissions may be monitored at S818, and the monitoring can be used to determine when the filter medium 35 has been rejuvenated and is ready to return to service. In an embodiment, a sensor 37 is coupled to the vacuum conduit 23 and monitors at least one of a concentration of gasses and a type of gasses. Monitor the gasified hydrocarbon using the illuminating laser and the spectroscopy camera, identify and count the species populations; at a minimum population level, the filter has been rejuvenated. When the concentration of one or more species of gasses falls below a threshold value, the system may determine that the filter medium 35 is rejuvenated. In addition, the sensor 37 may determine the type of gasses volatilized from the contaminated filter medium to characterize the contents of the syngas. In still another embodiment, a vacuum gauge may be coupled to the vacuum pump 11, and when a vacuum level falls below a threshold value, the system may determine that most or all the contaminants have been volatilized.

In such an embodiment, vacuum levels can be used to determine a level of the volatilized contaminants present in the vacuum stream.

When the system determines that most or all of the contaminants have been volatilized, the infrared radiators are turned off and the chamber is allowed to cool at S820. Cooling of the chamber may be assisted by water cooling in one or more of walls 34 and 44. After the chamber 5 has cooled sufficiently, contaminated fluid is re-introduced into the chamber and process 800 is performed again by re-introducing contaminated fluid at S802.

The embodiments described by the present disclosure provide numerous advantages over conventional filtration systems and processes. Rejuvenating a filter medium in situ can reduce costs and waste compared to conventional processes, and volatilization of contaminants can neutralize harmful materials and produce syngas, which is a useful product. In addition, embodiments of the present disclosure have a lower total carbon footprint than existing processes.

The invention claimed is:

1. A method for filtering a contaminated fluid and in situ rejuvenation of a filter medium, the method comprising:

introducing a flow of the contaminated fluid into a reaction chamber comprising a filter medium and a first array of infrared heating elements separated from the filter medium by a first ceramic glass wall having a pass-band in the infrared spectrum;

passing the contaminated fluid across the filter medium to remove contaminants from the contaminated fluid until the filter medium is loaded;

stopping the flow of the contaminated fluid across the filter medium;

heating the loaded filter medium by transmitting infrared energy from the first array of infrared heating elements through the first ceramic glass wall at a frequency within the pass-band of the infrared spectrum to volatilize the contaminants trapped in the loaded filter medium;

collecting the volatilized contaminants; and re-introducing the contaminated fluid flow into the reaction chamber.

2. The method of claim 1, wherein the contaminated fluid is waste from a municipal sewage system, an agricultural process, or an industrial process.

3. The method of claim 1, wherein the first array of infrared heating elements is disposed outside of a chamber of the ceramic glass material and the filter medium is disposed within the chamber of the ceramic glass material.

4. The method of claim 1, wherein the reaction chamber further comprises a second array of infrared heating elements separated from the filter medium by a second ceramic glass wall having the pass-band in the infrared spectrum, and heating the contaminated filter medium further comprises transmitting infrared energy from the second array of infrared heating elements through the second ceramic glass wall at a frequency within the pass-band of the infrared spectrum.

5. The method of claim 4, wherein the first and second ceramic glass walls are cylindrical walls, the first array of infrared heating elements is disposed outside of the first cylindrical ceramic glass wall and directs energy inwards towards the filter medium, and the second array of infrared heating elements is disposed inside of the second cylindrical ceramic glass wall and directs energy outwards towards the filter medium.

6. The method of claim 5, wherein the filter medium is disposed in a space between the first ceramic glass wall and the second ceramic glass wall.

7. The method of claim 1, wherein the first infrared heating elements comprise a metal coil embedded in a ceramic refractory material.

8. The method of claim 1, further comprising:

before re-introducing the contaminated fluid flow, determining that the filter medium has been rejuvenated by determining a level of the volatilized contaminants present in a vacuum stream from the reaction chamber.

9. The method of claim 1, wherein the reaction chamber has an outer pressure bulkhead, a first space between the outer pressure bulkhead and the first array of infrared heating elements, and a second space between the first array of infrared heating elements and the filter medium, the method further comprising:

activating a pressure compensation pump to maintain a pressure within the first space to be within a predetermined range of a pressure in the second space.

10. The method of claim 1, wherein the volatilized contaminants are a syngas, and the syngas is collected and stored in a storage tank.

11. The method of claim 1, wherein the filter medium is selected from a mineral material, an activated carbon material, and a ceramic material.

12. A method for treating municipal wastewater, the method comprising:

receiving a flow of the municipal wastewater into a reaction chamber comprising a filter medium and a first array of infrared heating elements separated from the filter medium by a first ceramic glass wall having a pass-band in the infrared spectrum;

passing the wastewater across the filter medium to remove contaminants from the wastewater until the filter medium is loaded;

stopping the flow of wastewater across the filter medium;

heating the loaded filter medium by transmitting infrared energy from the first array of infrared heating elements through the first ceramic glass wall at a frequency within the pass-band of the infrared spectrum to volatilize the contaminants trapped in the loaded filter medium;

collecting the volatilized contaminants; and re-introducing the contaminated fluid flow into the reaction chamber.

13. The method of claim 12, wherein the filter medium is activated carbon.

14. The method of claim 13, wherein the heating comprises heating the loaded filter medium to a temperature from 300° C. to 850° C.

15. The method of claim 12, wherein the reaction chamber further comprises a second array of infrared heating elements separated from the filter medium by a second ceramic glass wall having the pass-band in the infrared spectrum, and heating the contaminated filter medium further comprises transmitting infrared energy from the second array of infrared heating elements through the second ceramic glass wall at a frequency within the pass-band of the infrared spectrum.

16. The method of claim 15, wherein the first and second ceramic glass walls are cylindrical walls, the first array of infrared heating elements is disposed outside of the first cylindrical ceramic glass wall and directs energy inwards towards the filter medium, and the second array of infrared heating elements is disposed inside of the second cylindrical ceramic glass wall and directs energy outwards towards the filter medium.

17. The method of claim 12, wherein the first infrared heating elements comprise a metal coil embedded in a ceramic refractory material.

18. The method of claim 12, further comprising:

before re-introducing the contaminated fluid flow, determining that the filter medium has been rejuvenated by determining a level of the volatilized contaminants present in a vacuum stream from the reaction chamber.

19. The method of claim 12, wherein the volatilized contaminants are a syngas, and the syngas is collected and stored in a storage tank.

20. A method for in situ rejuvenation of a filter medium, the method comprising:

introducing a flow of contaminated fluid into a reaction chamber comprising the filter medium, a first array of infrared heating elements separated from the filter medium by a first ceramic glass wall having a pass-band in the infrared spectrum, and a second array of infrared heating elements separated from the filter medium by a second ceramic glass wall having the pass-band in the infrared spectrum;

passing the contaminated fluid across the filter medium to remove contaminants from the contaminated fluid until the filter medium is loaded;

stopping the flow of the contaminated fluid across the filter medium;

heating the loaded filter medium by transmitting infrared energy from the first and second arrays of infrared heating elements through the first and second wall of the ceramic glass material at a frequency within the pass-band of the infrared spectrum to volatilize the contaminants trapped in the loaded filter medium;

collecting the volatilized contaminants; and re-introducing the contaminated fluid flow into the reaction chamber.

* * * * *